United States Patent [19]
Schiff

[11] Patent Number: 6,078,391
[45] Date of Patent: Jun. 20, 2000

[54] METHOD AND SYSTEM FOR SEGMENTED SCATTER MEASUREMENT

[75] Inventor: Tod F. Schiff, Portland, Oreg.

[73] Assignee: Schmitt Measurement Systems, Inc., Portland, Oreg.

[21] Appl. No.: 09/193,835

[22] Filed: Nov. 17, 1998

[51] Int. Cl.[7] ............................................ G01D 3/28
[52] U.S. Cl. .......................... 356/326; 237/337; 237/376; 237/445
[58] Field of Search ................................. 356/326, 237, 356/337, 376, 445

[56] References Cited

U.S. PATENT DOCUMENTS 5,625,451  4/1997  Schiff et al. .............................. 356/236

FOREIGN PATENT DOCUMENTS 60-52744  3/1985  Japan .............................. G10N 21/27

Primary Examiner—Frank G. Font
Assistant Examiner—Reginald A. Ratliff
Attorney, Agent, or Firm—Madson & Metcalf

[57] ABSTRACT

A system and method for characterizing a surface are disclosed. The system includes a light source and source optics which direct a beam of light toward the surface. A first optical integrating device is positioned and configured to receive a first portion of the scattered light and a second optical integrating device is positioned and configured to receive a second portion of the scattered light. The second optical integrating device reflects the second portion of the scattered light through a segmenting optic. The segmenting optic is configured to segment the second portion of the scattered light to thereby isolate the anisotropic roughness amplitude to one or more segments. A roughness ratio indicative of the anisotropic roughness is produced by comparing the roughness amplitudes of the segments.

21 Claims, 4 Drawing Sheets

METHOD AND SYSTEM FOR SEGMENTED SCATTER MEASUREMENT

BACKGROUND

1. The Field of the Invention

The present invention is related to optical methods and apparatus for non-contact inspection and characterization of a surface. More particularly, the present invention is related to methods and apparatus for segmenting a portion of the integrated scatter of a surface to thereby characterize the roughness of a surface.

2. The Background Art

The ability to accurately measure physical properties of a surface is important in a variety of applications. Such physical properties include roughness, texture, waviness, and information relating to the profile of the surface. The measure of such physical properties is generally referred to as "characterizing" a surface.

For example, in the field of computer hardware, it is preferable that computer hard disks be manufactured with a known roughness, generally referred to as "texture" by that industry. As a quality control measure, hard disk manufacturers desire a measurement device which permits them to quickly and easily measure surface roughness as precisely as possible. Current technology trends are moving toward surface texture levels requiring surface measurement down to about the 10 Angstrom level. It would be preferable if surface roughness could be measured to within 1 Angstrom or less.

Other applications where precise roughness measurements are desirable include the computer chip wafer industry. In manufacturing chip wafers, it is desirable that the front surface of the wafer be as smooth as possible and that the back side of the wafer is finished to a known roughness.

Also, the optical industry, particularly mirror manufacturers, desires high-precision measurement devices to gauge the quality of the surfaces of their optics. Such optics are typically employed in imaging systems such as those utilized in telescopes and satellites.

Some surface characterization instruments operate by contacting the surface. A profilometer is an example of such a device. A profilometer operates by dragging a stylus across a surface. The stylus is physically connected to a recorder which traces the profile of the surface. Mathematical analysis of the profile may be conducted to determine physical properties of the surface.

For many applications, such contact-based instruments and methods are unacceptable because of the risk of contamination or other damage to the surface. Additionally, they are extremely slow and do not provide sufficient resolution to be effective for use in many applications. Thus, there exists a great need for non-contact surface characterization devices and methods.

Surface inspection devices based on optics have generally proved to be the most effective at non-contact surface characterization. Such optical devices typically operate by directing a beam of light at the surface and measuring the amount and direction of non-specular light scattered off the surface. Through the analysis of such data, much information regarding the character of the surface can be ascertained. This information includes roughness, texture, waviness, and information relating to the profile of the surface.

One such non-contact, optical-based device is the scatterometer. To measure roughness, for example, the scatterometer measures the scatter intensity of the scattered light at every scatter angle in a selected plane. This information can then be used to generate the "power spectral density" function for that plane. The power spectral density function illustrates the distribution of the power scattered by each spatial frequency. The roughness of the surface can then be approximated by integrating the power spectral density function.

The scatter of a surface is distributed throughout an upper hemisphere above the surface receiving a beam of light. One disadvantage to the use of such scatterometers is that because the scatterometer measures only one plane of the scatter hemisphere, only a small portion of the total information about the surface is obtained. If the surface is isotropic, such methods are generally accurate. For isotropic surfaces, the total roughness is determined by performing three-dimensional integration on the power spectral density function. However, if the surface is non-isotropic, wherein anisotropic structures are present on the surface such that the surfaces have a "lay" to them or randomly rough surfaces, a scatterometer may produce grossly inaccurate results.

One method for characterizing non-isotropic surfaces is to measure the scatter intensity at every point in the scatter hemisphere. The sample data can then be manually integrated to determine the roughness. Such a method can be performed with an "out-of-plane" scatterometer. This method is extremely time consuming and is therefore not practical for most applications which require rapid inspection and analysis.

In an attempt to make scatter measurement more efficient and versatile, it has been noted that plotting the power spectral density versus the spatial frequency on a log—log plot will generally result in a straight-line curve. Thus, by obtaining two representative points on this line, the curve can be approximated. By integrating this function over selected spatial frequency limits, surface roughness can be determined.

One difficulty with this process is that the power spectral density data is two dimensional; thus, the process only works well for isotropic surfaces. Additionally, because of the limitations on the physical size of the detector, the representative points used to generate the curve are close together. Hence, any noise in the data could substantially decrease the accuracy of the fit of the curve.

Measuring additional data points to improve the fit of the curve becomes difficult because of the complexity of the necessary instrumentation. Additionally, the math to include additional data points becomes unduly complicated. Also, the inclusion of more data points still does not account for non-isotropic variations in the surface. Thus, attempting to add additional data points to improve the curve fit is not viable for many applications.

The conventional method which is currently preferred for characterizing non-isotropic surfaces is the "total integrated scatter" method. According to this generally accepted method, an optical integrating device, such as a hollow sphere, generally referred to as an "integrating sphere," is placed over the surface of the sample. The integrating sphere has an input aperture through which a beam of light may be directed into the device. A sampling aperture on the other end of the sphere permits the light to be directed onto the surface and allows light scattered off the surface to enter the sphere. An output aperture is also configured into the sphere for permitting the reflected specular beam to exit the sphere. Thus, the light scattered off the surface remains within the sphere and its intensity can be measured with a detector. This method measures most of the scattered light regardless of variations in the surface. However, some scattered light does escape from the output aperture and is therefore not measured.

An additional component which improves the collection of scattered light is the use of a second optical integrated device, such as a focusing mirror. The focusing mirror is disposed and configured to capture scattered light reflected off the surface which passes through the output aperture of the integrating sphere. The scattered light reflected by the mirror is focused to a detector which measures the intensity of this portion of scattered light. In this manner, substantially all of the scattered light is collected for measuring the total integrated scatter. Such an apparatus and method is disclosed in U.S. Pat. No. 5,625,451 to Schiff et al. which is hereby incorporated by reference.

The prior art methods are useful in determining the total integrated scatter off a surface which allows for a detailed analysis of the roughness of the surface. However, it would be advantageous to be able to isolate and measure the anisotropic and isotropic components of the surface roughness. Certain precision made surfaces are manufactured with particular anisotropic roughness for various purposes. Other surfaces have anisotropic roughness due to imperfections in the manufacturing. Presently a convenient method for performing measurements of anisotropic roughness in comparison to the isotropic roughness is not available.

From the foregoing, it will be appreciated that it would be an advancement in the art to provide improved non-contact methods and apparatus for characterizing a surface to provide anisotropic and isotropic measurements.

It would be a further advancement in the art to provide such an apparatus would could be integrated with an optical integration device which is convenient to use, and which could accomplish rapid inspection and analysis.

Such methods and apparatus are disclosed and claimed herein.

BRIEF SUMMARY

A system collects scattered light and segments the scattered light to compare anisotropic and isotropic roughness of the surface. The system includes a light source capable of producing a beam of light at a predetermined wavelength which is directed to the surface to create a reflected specular beam and scattered light. The system further includes a collector having at least one optical integrating device for collecting the scattered light over a hemisphere above the surface and across spatial frequency bands to determine the total integrated scatter. The collected scatter over the hemisphere of the surface is both a function of $\theta_s$ and $\Phi_s$, wherein $\theta_s$ refers to a range of incident angles with respect to the normal of the surface, and $\Phi_s$ refers to a range of circumferential angles. Spatial frequency limits are based on $\theta_i$ and $\theta_s$ with light collected being around the full $\Phi_s$ of $2\pi$ radians. Selected spatial frequency limits establish bands of spatial frequency.

With the total integrated scatter determined for a set of spatial frequency limits, physical properties of the surface, such as roughness may be characterized. The total integrated scatter contains light scatter from isotropic and anisotropic roughness on the surface. The system comprises a segmenting optic positioned and configured to receive the scattered light from the collector and segment the scattered light into a plurality of segments. The segmenting optic is configured to segment the scattered light to isolate the anisotropic roughness to one or more segments. Detectors are positioned to measure and detect the intensity of each segment. A determination of the anisotropic and isotropic components of the total integrated scatter allows for comparisons of anisotropic and isotropic structures on the surface.

Thus, it is an objective of the invention to provide an apparatus capable of providing characterization of the anisotropic and isotropic roughness of a surface while still providing the overall characterization of the roughness.

BRIEF DESCRIPTION OF THE DRAWINGS

A more particular description of the invention briefly described above will be rendered by reference to the appended drawings. Understanding that these drawings only provide information concerning typical embodiments of the invention and are not therefore to be considered limiting of its scope, the invention will be described and explained with additional specificity and detail through the use of the accompanying drawings, in which.

DETAILED DESCRIPTION OF THE PREFERRED EMBODIMENTS

Figure 1:
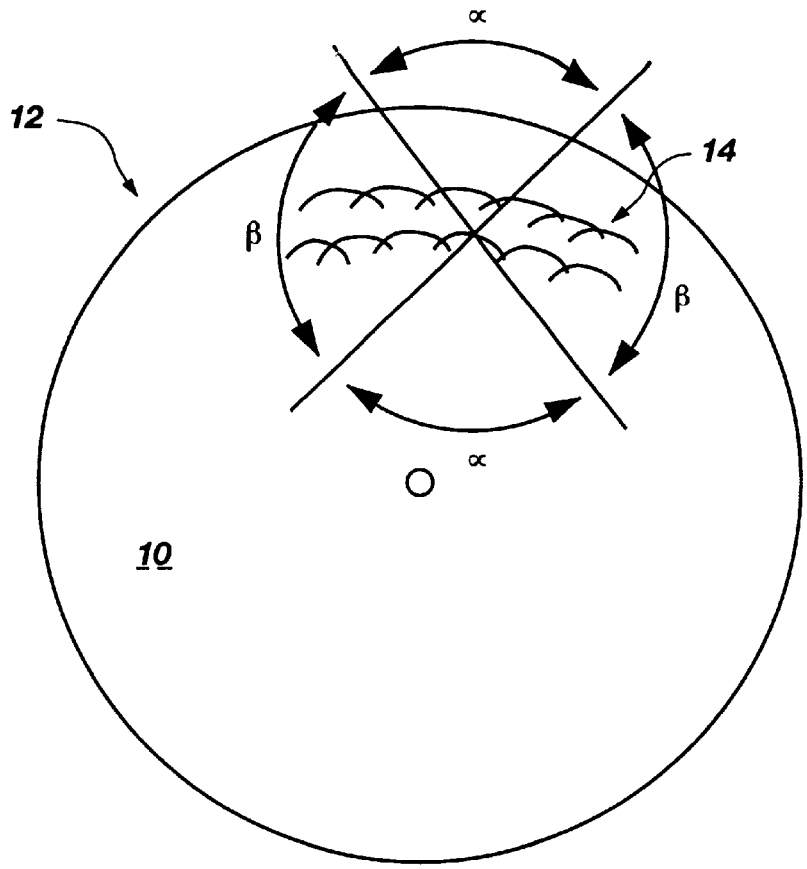
FIG. 1 is a top view of a surface having circumferentially placed anisotropic structures.

The present invention is directed to novel apparatus and methods for use in segmenting light scatter and measuring the segmented scatter to determine roughness components of a surface. The process of light scatter begins by directing a beam of light having a known wavelength ($\lambda$) onto the surface at a known incident angle ($\theta_i$) with respect to the normal of a surface. The collected scatter over the hemisphere of the surface is both a function of $\theta_s$ and $\Phi_s$, wherein $\theta_s$ refers to a range of incident angles with respect to the normal of the surface, and $\Phi_s$ refers to a range of circumferential angles. Spatial frequency limits are based on $\theta_i$ and $\theta_s$ with light collected being around the full $\Phi_s$ of $2\pi$ radians. Selected spatial frequency limits establish bands of spatial frequency.

The total scatter of light or total integrated scatter corresponding to each of the selected bands of spatial frequencies is measured by collecting the scattered light over a range of scatter angles ($\theta_n$) corresponding to the spatial frequency band. A conventional optical integrating device, comprising integrating spheres, lenses, mirrors, or the like, collects the total integrated scatter. An embodiment of an optical integrating device suitable for use with the invention is disclosed below. With the total integrated scatter determined for a set of spatial frequency limits, physical properties of the surface may be characterized. Such physical properties include RMS roughness, sometimes referred to as texture, waviness, representative profile, or haze.

Scatter from a surface is perpendicular to the structure on the surface producing the scatter. A segment of $\theta_s$ and $\Phi_s$ provides roughness amplitude of the surface over a range of spatial frequencies for roughness oriented over a range of "direction" angles on the surface. The roughness amplitude provides the roughness of the "background" that exists on the entire surface which is referred to herein as the isotropic roughness. The roughness amplitude further provides the roughness of any anisotropic structures that may exist on surface and is referred to herein as the anisotropic roughness. Non-isotropic surfaces contain both isotropic and anisotropic structures which will create both isotropic and anisotropic scatter when contacted by a beam of light. Thus, the total integrated scatter will have light scatter components from the isotropic and anisotropic roughness.

The isotropic roughness scatters light uniformly as a function of $\Phi_s$. Thus, a slice of scatter of angle $\Phi_s$ will have the following amount of collected light for the isotropic component only:

$$P_{collected} = \left(\frac{\phi_s}{2\pi}\right) P_{isotropic},$$

where $P_{isotropic}$ is the total amount of isotropic scattered light, and $P_{collected}$ is the collected component of scattered light of $P_{isotropic}$.

Where the direction of anisotropic structures are uniform and known, the scatter of a surface may be collected and broken into two segments to isolate the anisotropic roughness into one segment. Both segments contain components of $P_{isotropic}$ and one segment contains the total component of $P_{anisotropic}$. A system for segmenting scatter to isolate the anisotropic roughness is referred to herein as a directional integrated scatter (DIS) system. Where the anisotropic structure is circumferential, the invention uses a two segment DIS system to quantify directionality of roughness with respect to $\Phi_s$. The DIS system breaks the scatter into sections defined by $\Phi_s$ to yield directional information about roughness in a given direction. The configuration and operation of the two segment DIS system is now explained.

With reference to FIG. 1, a surface 10 of a computer disk 12, such as a hard disk, is shown. A hard disk surface 10 is used for an illustrative explanation of the invention and is a surface typically measured for roughness. The hard disk surface 10 has anisotropic structures which are embodied as circumferential scratches 14. Hard disks are typically textured by a process that yields scratches which are usually created using an oscillating rotating pad. The oscillating rotating pad produces the circumferential scratches 14 on the disk. Although a hard disk surface 10 is represented, one of skill in the art will appreciate that the invention is applicable to numerous other surfaces as well.

As shown in FIG. 1, the full $\Phi_s$ of $2\pi$ radians is divided into two alpha components and two beta components. The two alpha components represent one segment and will be directed by the DIS system to one detector, whereas the two beta components represent a second segment and will be directed to another detector. The alpha and beta angles are 90 degree angles so that the segments cover two equal cross sectional areas. The alpha and beta segmentation is achieved by a segmenting optic which will be discussed in greater detail below. The division of the surface scatter into two segments defined by alpha and beta components is only one method for performing the method of the present invention and one of skill in the art will appreciate that there are other methods which are included within the scope of the invention.

Scatter from a surface is perpendicular to the structure on the surface producing the scatter. Thus, because the scratches are circumferential, there is no discharge from the scratches into the beta components, only the alpha components. The DIS system can measure the ratio between roughness amplitudes due to the circumferential scratches and isotropic background roughness. The alpha segment contains scattered power ($P_{alpha}$) from half of the isotropic scatter and all of circumferential anisotropic scatter. The beta segment contains scattered power ($P_{beta}$) from half of the isotropic roughness. Thus, the following equations define the segmented scatter:

$$P_{alpha} = 1/2(P_{isotropic}) + P_{anisotropic},$$

$$P_{beta} = 1/2(P_{isotropic}),$$

$$P_{alpha} - P_{beta} = P_{anisotropic},$$

$$P_{alpha} + P_{beta} = P_{total},$$

where $P_{anisotropic}$ represents all the scattered power from the circumferential roughness. In this manner, the anisotropic and isotropic scatters may be separated and measured from the total scatter.

A new parameter (L) is defined herein as a contrast ratio between roughness amplitude in the alpha and beta segments. The ratio L allows for a comparison indicative of the circumferential anisotropic roughness to the isotropic roughness. The ratio L is further a comparison of scatter found looking radially (R) and circumferentially (C). Thus, the following relationship exists for the ratio L:

$$L = \frac{R}{C} = \frac{P_{alpha}}{P_{beta}}.$$

Figure 2:
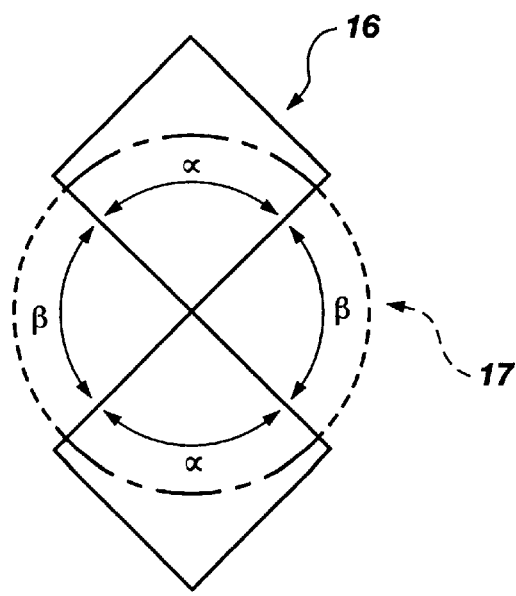
FIG. 2 is a top view of one preferred embodiment for optics used to separate segments of light scattered from a surface.

With reference to FIG. 2, one presently preferred segmenting optic to divide light scatter into alpha and beta segments is shown and generally designated 16. The segmenting optic 16 comprises a set of square mirrors 16 and is anticipated for use with a scatter beam 17 having a circular cross section. The square mirrors are precisely placed to cover the alpha components of the scatter beam. In operation, the scatter beam 17 is directed to the segmenting optic 16. The scatter beam 17 is intersected by the square mirrors 16. The beta segment passes by the square mirrors 16 to one detector, whereas the alpha segment is reflected by the square mirrors 16 to a second detector. Alternatively, the segmenting optic 16 may be positioned to reflect the beta segment and pass the alpha segment. The objective is to separate the alpha and beta segments and direct the segments to respective and independent detectors.

Where the anisotropic structure on the surface is uniformly radial, the segmenting optic 16 as shown in FIG. 2 may still be used. With such an anisotropic structure, the anisotropic scatter will be in the beta segments. It follows then that the equations from above will be for a radial anisotropic structure:

$$P_{beta} = 1/2(P_{isotropic}) + P_{anisotropic},$$

$$P_{alpha} = 1/2(P_{isotropic}),$$

$$P_{beta} - P_{alpha} = P_{anisotropic},$$

$$P_{alpha} + P_{beta} = P_{total},$$

$$L = \frac{C}{R} = \frac{P_{beta}}{P_{alpha}}$$

In this manner, a ratio roughness for both circumferential and radial anisotropic structures may be determined by dividing the scatter off a surface into two segments.

The segmenting optic 16 receives at least a portion of scattered light from the surface. The scattered light is collected from the surface by a device generically referred to as a collector. One of skill in the art will appreciate that such a collector may take any number of embodiments as long as it uniformly gathers both isotropic and anisotropic scatter from the surface. The collector then focuses or directs at least a portion of the scattered light to the segmenting optic.

Figure 3:
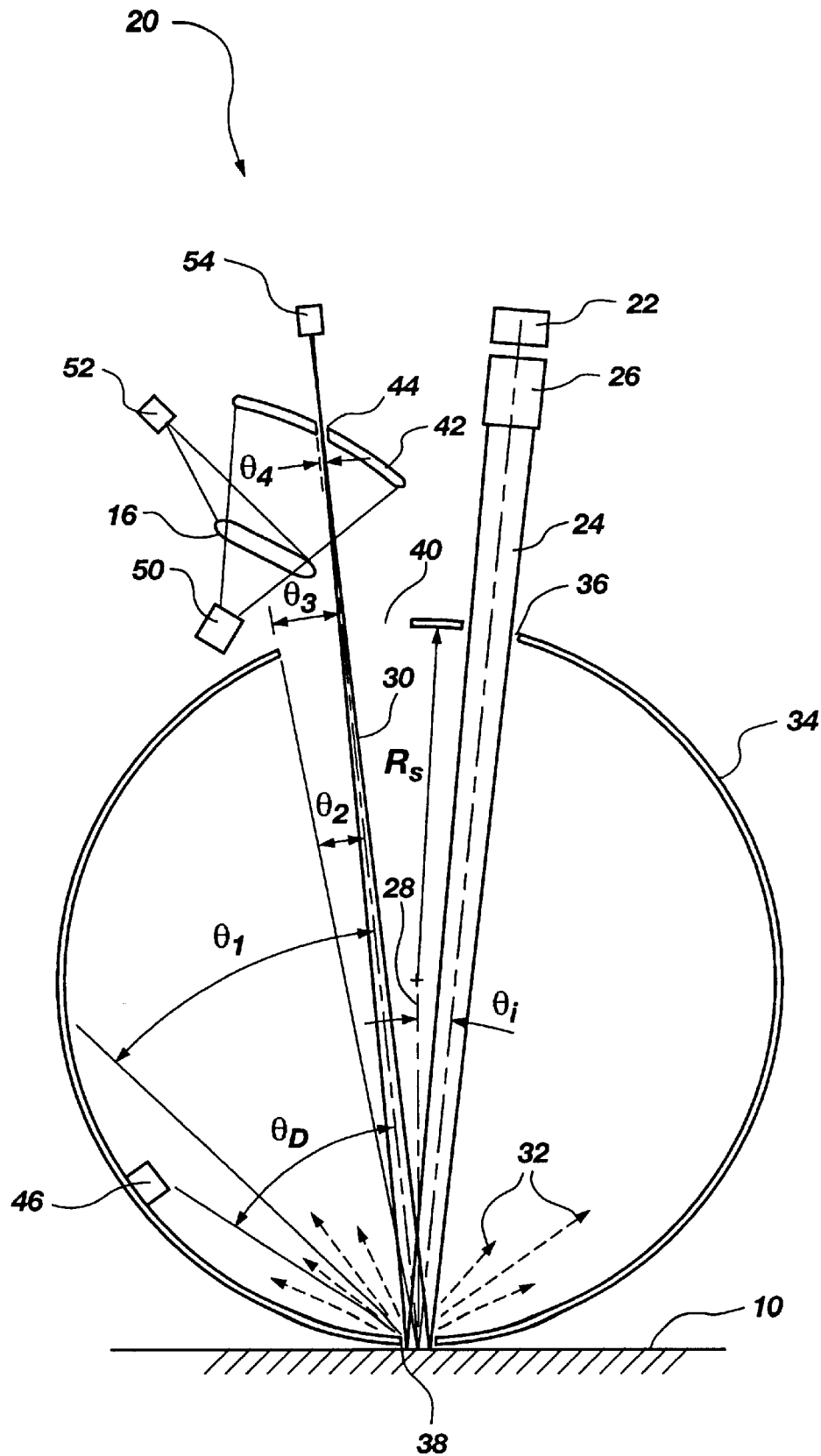
FIG. 3 is a schematic view of one preferred embodiment of an apparatus of the present invention with integrated optical devices illustrated in cross section.

With reference to FIG. 3, one embodiment of a two segment DIS system incorporating one presently preferred embodiment of a collector is generally designated 20. The DIS system 20 includes a light source 22 capable of producing a beam of light at a predetermined wavelength ($\lambda$). In the illustrated embodiment of the system 20, the light source 22 is a laser source which generates a laser beam 24 having a wavelength of 0.670 microns. One such laser source is the model "TOLD9225" laser diode marketed by Toshiba.

Positioned adjacent the laser source 22 are source optics 26 for directing the beam of light 24 toward the surface at an incident angle ($\theta_i$) with respect to the normal 28 of the surface 10. In this embodiment, the laser 22 and source optics 26 produce an incident beam having a circular cross section. The source optics 26 may include any of those conventional optical configurations known to one of skill in the art. When the beam of light 24 hits the surface 10, a specular beam 30 and scattered light 32 are reflected off the surface 10.

In this presently preferred embodiment, the system 20 includes a first optical integrating device 34 which is positioned and configured to receive a first portion of the scattered light while permitting a second portion of scattered light to pass through. The first optical integrating device 34 may be a sphere, a mirror, a lens, or any other optical integrating device modified in accordance with the teachings of the present invention. In this preferred embodiment, the first optical integrating device 34 is a hollow sphere 34 having a radius ($R_s$).

Such hollow spheres, generally referred to as "integrating spheres," are common in the art of optical measurement systems. The interior surface of the sphere 34 is a reflective material having a reflectance greater than about 90 percent. One presently preferred integrating sphere 34 is that sold by Labsphere, Inc. of New Hampshire, U.S.A., as model "SRM-99" under the SPECTRALON trade name, in which the interior surface has a reflectance of about 99.1 percent.

The sphere 34 is configured with an input aperture 36, a sampling aperture 38, and an output aperture 40. The apertures 36, 38, and 40 each have a circular perimeter with radii $r_i$, $r_s$, and $r_o$, respectively. The apertures are positioned within the sphere 34 and the sphere 34 is positioned relative to the light source 22 such that the beam of light 24 may be directed through the input aperture 36, through the sampling aperture 38, and onto the surface 10, and such that the second portion of the scattered light and the specular beam 30 are directed out of the sphere 34 through the output aperture 40.

The integrating sphere 34 is configured such that it captures the first portion of scattered light; that is, the scattered light extending from a first scatter angle ($\theta_1$) to a second scatter angle ($\theta_2$). The output aperture 40 is sized to permit the second portion of the scattered light, extending from a third scatter angle ($\theta_3$) to a fourth scatter angle ($\theta_4$), to exit the sphere 34. As illustrated in FIG. 3, the "scatter angle" is measured with respect to the specular beam 30.

The system 20 further includes a second optical integrating device 42 which is positioned and configured to receive the second portion of the scattered light as it exits the sphere 34 through the output aperture 40. Like the first optical integrating device 34, the second optical integrating device 42 may include an integrating sphere, a mirror, a lens, or other integrating device. In this embodiment, the second optical integrating device 42 comprises a focusing mirror 42 configured with an output aperture 44 through which the specular beam 30 may pass. The mirror 42 and the aperture 44 in the mirror 42 each have a circular perimeter with radii $r_{20}$ and $r_{21}$, respectively. The focusing mirror 42 is sized and positioned with respect to the sphere 34 such that it receives the scattered light extending from the third scatter angle ($\theta_3$) to the fourth scatter angle ($\theta_4$).

Thus, in this presently preferred embodiment, the collector comprises two optical integrating devices 34, 42. This has the advantage of performing the function of the invention to perform roughness ratios of anisotropic roughness to isotropic roughness, but also provides spectral integrated functions of the surface.

The source optics 26 are configured such that the specular beam 30 is positioned within the output aperture 44 of the focusing mirror 42. Preferably, however, the source optics 26 focus the specular beam 30 at the output aperture 44.

The system 20 also includes a first detector 46 positioned to detect the intensity of the first portion of the scattered light. In this embodiment, the first detector 46 is mounted in the wall of the sphere 34. Conventional integrating spheres typically employ a baffle to shield the detector from light scattered off the surface 10 directly into the detector. The present invention eliminates the need for a baffle by positioning the first detector 46 within the integrating sphere 34 such that the angle ($\theta_D$) between the specular beam 30 and the line between the sampling aperture 38 and the first detector 46 is greater than $\theta_1$.

The segmenting optic 16 is positioned relative to the focusing mirror 42 such that it receives the second portion of the scattered light. The segmenting optic 16 may be as embodied in FIG. 2 or may be configured in alternative embodiments to segment the second portion of the scattered light. With the embodiment of FIG. 2, the segmenting optic 16 passes the beta segment of the second portion of the scattered light. A second detector 50 is positioned to detect the intensity of the beta segment. The second detector 50 is positioned relative to the focusing mirror 42 such that the beta segment is reflected into the second detector 50. Accordingly, the focusing mirror 42 is configured to focus the beta segment within the field of view of the second detector 50.

As embodied in FIG. 2, the segmenting optic 16 reflects the alpha segment of the second portion of the scattered light. A third detector 52 is positioned relative to the segmenting optic 48 and the focusing mirror 42 such that the alpha segment is reflected into the third detector 52. The segmenting optic 16 and the focusing mirror are configured to focus the alpha segment within the field of view of the third detector 52.

Finally, a specular detector 54 is positioned to detect the intensity of the specular beam 30 after it passes through the second optical integrating device 42. The specular detector 54 must be positioned such that its field of view encompasses all of the specular beam 30. The specular detector 54 should be a "low scatter" detector to prevent it from being a source of stray light. The detectors 46, 50, 52, and 54 may include any detector known for such a use, including commercially available silicon photo diodes.

A principal source of "secondary" stray light is the hardware and mounting apparatus associated with all portions of the system 20 outside the sphere 34. The generation of such secondary stray light can be substantially eliminated by ensuring that the exterior surfaces are made out of, or coated with, a material which is light absorbing at the wavelength of the incident beam 24.

The signals from the detectors 46, 50, 52, and 54 are processed in accordance with standard signal processing techniques well known in the art. The signals are amplified, filtered, and processed by an analog-to-digital converter 55 before being processed by a microprocessor 56. One of skill in the art will readily appreciate how to process the signals to produce output data in a variety of useful forms. As previously discussed, the output data is used to determine a comparison of the anisotropic and isotropic structures of the surface 10. Other uses include additional characteristic determinations of the surface 10.

If the directionality of the anisotropic roughness is not known then a three segment DIS system is required. In such an embodiment, the segmenting optic 16 segments the second portion of the scattered light into three segments.

Figure 4:
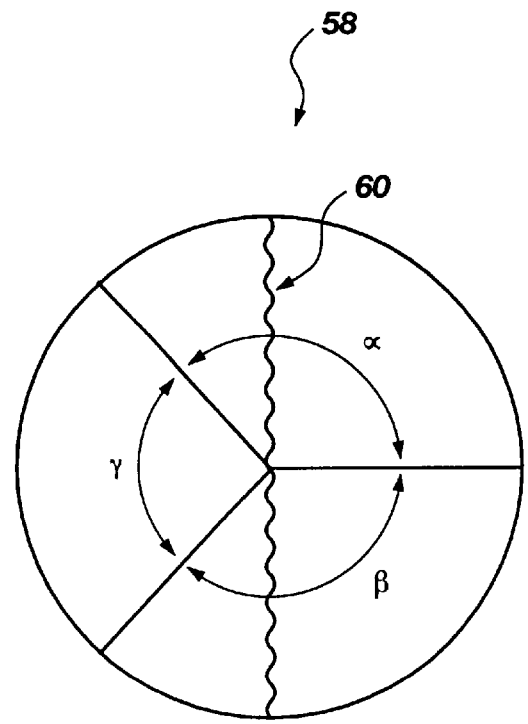
FIG. 4 is a top view of a surface having an anisotropic structure.

With reference to FIG. 4 an alternative segmentation scheme 58 is shown. The scattered light is segmented into the three segments which are defined by alpha, beta, and gamma angles and are referred to respectively as alpha, beta, and gamma segments. The alpha, beta, and gamma angles are equivalent and are therefore 120 degrees. An anisotropic structure traverses two of the segments. The anisotropic scatter is perpendicular to the anisotropic structure and will therefore be isolated to the two segments through which the anisotropic structure traverses. In FIG. 4, an anisotropic structure 60 is shown traversing the alpha and beta segments and the anisotropic scatter will be isolated to the alpha and beta segments. Isotropic scatter is equally divided among all three segments. For FIG. 4, the resulting anisotropic and isotropic scatter is thus:

$$P_{alpha} = 1/2(P_{anisotropic}) + 1/3(P_{isotropic})$$

$$P_{beta} = 1/2(P_{anisotropic}) + 1/3(P_{isotropic})$$

$$P_{gamma} = 1/3(P_{isotropic})$$

$$P_{anisotropic} = P_{anisotropic}$$

$$= |P_{alpha} - P_{gamma}| + |P_{alpha} - P_{beta}| + |P_{beta} - P_{gamma}|$$

$$P_{isotropic} = (P_{alpha} + P_{beta} + P_{gamma}) - P_{anisotropic}$$

One of skill in the art will appreciate that these equations will vary depending on the segments through which the anisotropic structure traverses. Such variances are readily determined with the $P_{anisotropic}$ value being equally divided between the two segments through which the anisotropic structure traverses. The roughness ratio L is computed as:

$$L = \frac{R}{C} = 1 + 2\left(\frac{P_{anisotropic}}{P_{isotropic}}\right)$$

which follows from the $P_{alpha}/P_{beta}$ analysis from the two segment DIS system given above.

Figure 5:
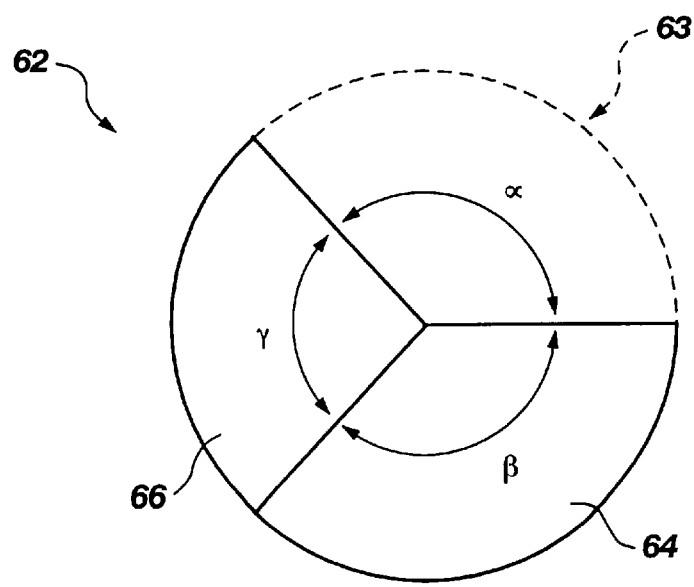
FIG. 5 is a top view of an alternative embodiment for optics used to separate segments of light scattered from a surface.

With reference to FIG. 5, one embodiment for a segmenting optic for a three segment DIS system is shown and generally designated 62. The scattered beam 63 is directed to the segmenting optic 62. As with the two segment segmenting optic 16, the segmenting optic 62 receives at least a portion of scattered light from a collector. The purpose of the segmenting optic 62 is to segment the second portion of the scattered light into three segments and to direct the three segments to three detectors. Thus, one of skill in the art will appreciate that various embodiments for the segmenting optic 62 are possible and are within the scope of the invention. In the presently preferred embodiment of FIG. 5, the segmenting optic 62 passes the alpha segment by not having an optic to intercept the alpha segment. The segmenting optic 62 comprises a first mirror 64 to receive and reflect the beta segment in a first direction. The segmenting optic 62 further comprises a second mirror 66 to reflect the gamma segment in a second direction. The first and second mirrors 64, 66 are configured and disposed to cover the cross sectional areas of the beta and gamma segments. In this manner, all three segments are separated into different directions.

Figure 6:
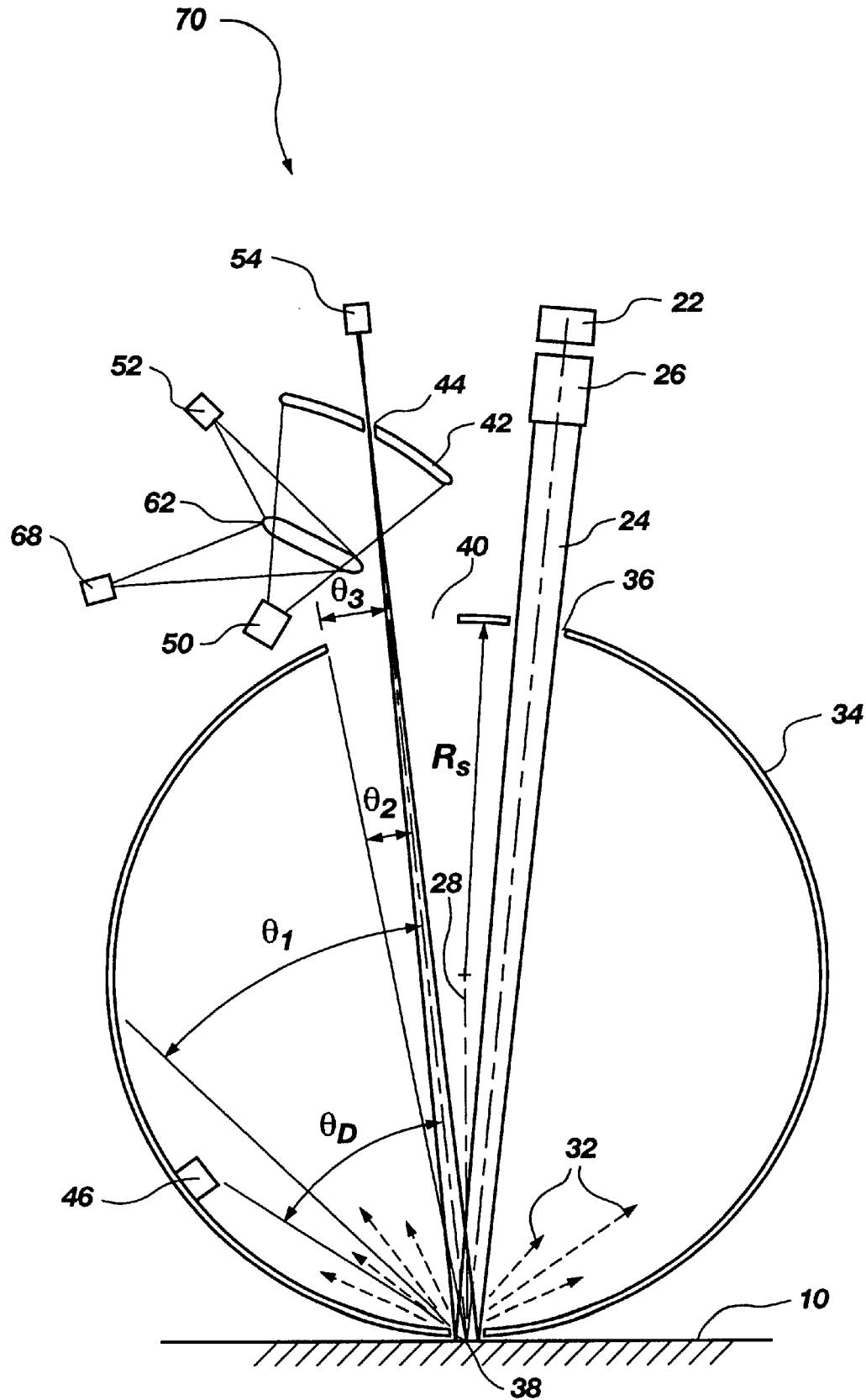
FIG. 6 is a schematic view of an alternative embodiment of an apparatus of the present invention with integrated optical devices illustrated in cross section.

With reference to FIG. 6, a three segment DIS system is shown and generally designated as 70. The system 70 generally functions as that of the two segment DIS system shown in FIG. 2. The system 70 differs in that the segmenting optic 62 segments the second portion of the scattered light into three segments. The segmenting optic 62 is positioned relative to the focusing mirror 42 such that it receives the second portion of the scattered light. The segmenting optic 62 may be as embodied in FIG. 5 or may be configured in alternative embodiments to segment the second portion of the scattered light.

With the embodiment of FIG. 5, the segmenting optic 62 passes the alpha segment of the second portion of the scattered light. The second detector 50 is positioned to detect the intensity of the alpha segment. The second detector 50 is positioned relative to the focusing mirror 42 such that the alpha segment is reflected into the second detector 50. The segmenting optic 62 reflects the beta segment of the second portion of the scattered light. The third detector 52 is positioned relative to the segmenting optic 62 and the focusing mirror 42 such that the beta segment is reflected into the third detector 52. The segmenting optic 62 further reflects the gamma segment of the second portion of the scattered light to a fourth detector 68 positioned relative to the segmenting optic 62 and the focusing mirror 42. As with the two segment DIS system, a specular detector 54 is positioned to detect the intensity of the specular beam 30 after it passes through the second optical integrating device 42.

As with the embodiment of FIG. 3, the signals from the detectors 46, 50, 52, 54, and 68 are processed through amplification, filtering, and processed by an analog-to-digital converter 55 before being processed by a microprocessor 56. The output data is used to determine a comparison of the anisotropic and isotropic structures of the surface 10.

The apparatus and method of the present invention provides for roughness comparisons between anisotropic roughness and isotropic or "background" roughness. Such comparisons may be made where the directionality of the anisotropic structure is known and where it is unknown. The apparatus and method of the present invention may be incorporated into a spectral integrated scatter device which collects scattered light from a surface to provide the power spectral density function. Integration of the power spectral density function provides the approximate roughness of the surface. Thus, a spectral/directional integrated scatter device provides the approximate roughness of the surface and a ratio of the anisotropic to isotropic roughness.

It should be appreciated that the apparatus and methods of the present invention are capable of being incorporated in the form of a variety of embodiments, only a few of which have been illustrated and described above. The invention may be embodied in other forms without departing from its spirit or essential characteristics. The described embodi-

What is claimed is:

1. A method for characterizing a surface, comprising the steps of:
   directing a beam of light onto the surface at a known incident angle with respect to the normal of the surface;
   collecting light scatter off the surface;
   segmenting at least a portion of the light scatter into a plurality of segments and substantially removing light scatter resulting from an anisotropic structure on the surface from one segment;
   detecting and measuring the intensity of each segment; and
   determining a roughness ratio indicative of a comparison of the anisotropic roughness to the isotropic roughness of the surface.

2. A method for characterizing a surface as defined in claim 1, wherein the step of collecting the light scatter comprises using a plurality of optical integrating devices.

3. A method for characterizing a surface as defined in claim 2, wherein the optical integrating devices include an integrating hollow sphere and a focusing mirror.

4. A method for characterizing a surface as defined in claim 3, wherein the step of segmenting at least a portion of the scatter of light into a plurality of segments comprises using a segmenting optic, and further comprises the step of reflecting at least a portion of the light scatter light from the focusing mirror to the segmenting optic.

5. A method for characterizing a surface as defined in claim 1, wherein the step of segmenting at least a portion of the light scatter into a plurality of segments comprises using a segmenting optic.

6. A method for characterizing a surface as defined in claim 5, wherein the segmenting optic segments the at least a portion of the light scatter into two equally sized cross sectional segments with one segment containing substantially all of the anisotropic light scatter.

7. A method for characterizing a surface as defined in claim 5, wherein the segmenting optic segments the at least a portion of the light scatter into three equally sized cross sectional segments with one segment substantially not containing any of the anisotropic light scatter.

8. A method for characterizing a surface as defined in claim 5, wherein the step of detecting and measuring the intensity of each segment comprises using a detector for each segment.

9. A method for characterizing a surface as defined in claim 8, wherein the segmenting optic passes one segment to a first detector and reflects at least one segment to a second detector.

10. A system for characterizing a surface, comprising:
    a light source capable of producing a beam of light at a predetermined wavelength ($\lambda$);
    source optics for directing the beam of light toward the surface at an incident angle ($\theta_i$) with respect to the normal of the surface to thereby create a reflected specular beam and scattered light;
    a collector positioned and configured to collect the scattered light;
    a segmenting optic positioned and configured to receive at least a portion of the scattered light from the collector and segment the at least a portion of the scattered light into a plurality of segments wherein the segmenting optic is configured to segment the at least a portion of the scattered light such that a first segment does not include substantially any anisotropic light scatter;
    a first detector positioned to detect the intensity of the first segment; and
    a second detector positioned to detect the intensity of a second segment.

11. A system for characterizing a surface as defined in claim 10, wherein the collector comprises:
    a first optical integrating device positioned and configured to receive a first portion of the scattered light, the first portion of the scattered light extending from a first scatter angle ($\theta_1$) to a second scatter angle ($\theta_2$);
    a third detector positioned to detect the intensity of the first portion of the scattered light; and
    a second optical integrating device positioned and configured to receive a second portion of the scattered light, the second portion of the scattered light extending from a third scatter angle ($\theta_3$) to a fourth scatter angle ($\theta_4$), the second optical integrating device directing the second portion of the scattered light to the segmenting optic.

12. A system for characterizing a surface as defined in claim 11, wherein the first optical integrating device comprises:
    a hollow sphere having a radius ($R_S$), the hollow sphere configured with an input aperture, a sampling aperture, and an output aperture;
    the light source, source optics, and sphere positioned for directing the beam of light through the input aperture, through the sampling aperture, and onto the surface and such that the second portion of the scattered light and the specular beam are directed out of the sphere through the output aperture; and
    wherein the second optical integrating device comprises a focusing mirror configured with an output aperture for allowing the specular beam to pass, the focusing mirror positioned to focus the second portion of the scattered light into the segmenting optic.

13. A system for characterizing a surface as defined in claim 12 wherein the third detector is positioned within the integrating sphere such that an angle ($\theta_D$) between the specular beam and the line between the sampling aperture and the first detector is greater than $\theta_1$.

14. A system for characterizing a surface as defined in claim 12, wherein the source optics are configured such that the specular beam is positioned within the output aperture of the focusing mirror.

15. A system for characterizing a surface as defined in claim 10, further comprising a specular detector positioned to detect the intensity of the specular beam.

16. A system for characterizing a surface as defined in claim 10, wherein the segmenting optic is configured to segment the at least a portion of the scattered light into two segments and is configured to pass the first segment to the first detector and reflect the second segment to a second detector.

17. A system for characterizing a surface as defined in claim 11, further comprising a fourth detector, the segmenting optic is configured to segment the at least a portion of the scattered light into three segments and is configured to pass the first segment to the first detector, reflect the second segment to a second detector, and reflect a third segment to the fourth detector.

18. A system for characterizing a surface as defined in claim 10, wherein the segmenting optic is disposed and configured to segment the at least a portion of the scattered light such that the segments have equivalent cross sectional areas.

19. A system for characterizing a surface as defined in claim 10, wherein the segmenting optic comprises two mirrors, the segmenting optic being disposed and configured to pass the first segment to the first detector and reflect the second segment to the second detector.

20. The method for characterizing a surface as defined in claim 1 further comprising isolating the anisotropic scatter to one or more remaining segments.

21. A system for characterizing a surface as defined in claim 10 wherein the segmenting optic is further configured to isolate the anisotropic scatter in the second segment.

* * * * *